(12) United States Patent
Katsuyama et al.

(10) Patent No.: US 11,796,442 B2
(45) Date of Patent: Oct. 24, 2023

(54) POROSITY DERIVING METHOD AND POROSITY DERIVING DEVICE

(71) Applicant: HONDA MOTOR CO., LTD., Tokyo (JP)

(72) Inventors: Yasuro Katsuyama, Saitama (JP); Yuichi Tajiri, Saitama (JP); Takehiro Fukushima, Saitama (JP); Rio Koyama, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/680,321

(22) Filed: Feb. 25, 2022

(65) Prior Publication Data

US 2022/0299417 A1    Sep. 22, 2022

(30) Foreign Application Priority Data

Mar. 16, 2021    (JP) .................................. 2021-042422

(51) Int. Cl.
   *G01N 15/08*    (2006.01)
   *G01G 9/00*    (2006.01)
   (Continued)

(52) U.S. Cl.
   CPC ........... *G01N 15/088* (2013.01); *G01B 11/06* (2013.01); *G01B 17/02* (2013.01); *G01G 9/005* (2013.01);
   (Continued)

(58) Field of Classification Search
   CPC .. G01N 15/088; G01N 15/0893; G01B 11/06; G01B 17/02; G01G 9/00;
   (Continued)

(56) References Cited

U.S. PATENT DOCUMENTS

| 6,048,607 A * | 4/2000 | Hashimoto | H01M 50/417 |
| | | | 521/61 |
| 9,236,606 B2 * | 1/2016 | Tadano | H01M 4/62 |

(Continued)

FOREIGN PATENT DOCUMENTS

| CN | 104237965 A | * 12/2014 |
| JP | 2012212541 A | * 11/2012 |

(Continued)

OTHER PUBLICATIONS

Translation JP 2-15118806 Foreign_Reference_2021-01-15.pdf (Year: 2021).*
Translation _JP_2015118806_A_I.pdf (Year: 2015).*

*Primary Examiner* — Peter J Macchiarolo
*Assistant Examiner* — Monica S Young
(74) *Attorney, Agent, or Firm* — CKC & PARTNERS CO., LLC

(57) ABSTRACT

Provided are a porosity deriving method and a porosity deriving device capable of deriving a porosity of an inspection object being conveyed. The porosity deriving method of deriving a porosity of the inspection object includes: a basis weight measuring step including measuring a basis weight of a specific part of the inspection object being conveyed; a thickness measuring step including measuring a thickness of the specific part of the inspection object being conveyed; and a porosity deriving step including deriving a porosity of the inspection object from the basis weight, the thickness, and a true density of the inspection object.

7 Claims, 2 Drawing Sheets

(51) Int. Cl.
*G01B 17/02* (2006.01)
*G01B 11/06* (2006.01)
*G01G 17/02* (2006.01)
*H01M 10/052* (2010.01)
*H01M 10/48* (2006.01)

(52) U.S. Cl.
CPC ......... *G01N 15/0893* (2013.01); *G01G 17/02* (2013.01); *H01M 10/052* (2013.01); *H01M 10/48* (2013.01)

(58) Field of Classification Search
CPC .......... G01G 9/05; G01G 9/005; G01G 17/02; H01M 10/48; H01M 10/52; Y02E 60/10
USPC ............................................................ 73/38
See application file for complete search history.

(56) References Cited

U.S. PATENT DOCUMENTS

| | | | |
|---|---|---|---|
| 11,519,879 B2 * | 12/2022 | Liu | G01N 29/11 |
| 2012/0111103 A1 * | 5/2012 | Matsumoto | G01B 11/306 |
| | | | 73/150 R |
| 2020/0014071 A1 | 1/2020 | Nakashima et al. | |
| 2020/0096380 A1 * | 3/2020 | Nebel | G01N 21/3151 |

FOREIGN PATENT DOCUMENTS

| | | | | |
|---|---|---|---|---|
| JP | 2013044536 A | * | 3/2013 | |
| JP | 2015118806 A | * | 6/2015 | |
| JP | 2017068939 A | * | 4/2017 | |
| JP | 2017068939 A | | 4/2017 | |
| JP | 2020053300 A | * | 4/2020 | |
| JP | 2020053300 A | | 4/2020 | |
| WO | 2011013180 A1 | | 2/2011 | |
| WO | WO-2011013180 A1 | * | 2/2011 | ........... G01B 11/306 |
| WO | 2018186442 A1 | | 10/2018 | |
| WO | WO-2020195091 A1 | * | 10/2020 | ........... H01M 4/364 |
| WO | WO-2021172143 A1 | * | 9/2021 | |

* cited by examiner

POROSITY DERIVING METHOD AND POROSITY DERIVING DEVICE

This application is based on and claims the benefit of priority from Japanese Patent Application No. 2021-042422, filed on 16 Mar. 2021, the content of which is incorporated herein by reference.

BACKGROUND OF THE INVENTION

Field of the Invention

The present invention relates to a porosity deriving method and a porosity deriving device.

Related Art

In the related art, measurement of a porosity of an inspection object has been conducted as a procedure for inspecting the inspection object. For example, as a method of measuring a porosity of a solid electrolyte filled with an electrolyte, there is known a method of measuring a porosity based on a captured image of a cross section of the solid electrolyte with image analysis software (see Patent Document 1).
Patent Document 1: PCT International Publication No.

SUMMARY OF THE INVENTION

According to the method of measuring a porosity disclosed in Patent Document 1, it is necessary to cut a sample and take a picture of a cross section of the sample at the time of measuring the porosity. Accordingly, the method is employed to conduct a sampling inspection on an actual production line. Such a sampling inspection may make it impossible to find some defective products, and may allow an increase in the number defective products due to delayed feedback. Accordingly, there has been a demand for development of a method of deriving a porosity of an inspection object being conveyed in an in-line manner.

The present invention has been made in view of the above circumstance, and is directed to providing a porosity deriving method and a porosity deriving device capable of deriving a porosity of an inspection object being conveyed.

A first aspect of the present invention is directed to a porosity deriving method of deriving a porosity of an inspection object. The porosity deriving method includes: a basis weight measuring step including measuring a basis weight of a specific part of the inspection object being conveyed; a thickness measuring step including measuring a thickness of the specific part of the inspection object being conveyed; and a porosity deriving step including deriving a porosity of the inspection object from the basis weight, the thickness, and a true density of the inspection object.

The first aspect of the present invention provides the porosity deriving method capable of deriving the porosity of the inspection object, while the inspection object is being conveyed.

A second aspect is an embodiment of the first aspect. In the porosity deriving method according to the second aspect, the inspection object is a base member filled with a filling material, the basis weight measuring step includes measuring a basis weight of the base member and a basis weight of the filling material, and the porosity deriving step includes deriving the porosity of the inspection object from the basis weight of the base member, the basis weight of the filling material, the thickness of the inspection object, a true density of the base member, and a true density of the filling material.

The second aspect of the present invention provides the porosity deriving method capable of deriving a porosity of the base member filled with the filling material, while the base member is being conveyed.

A third aspect is an embodiment of the second aspect. In the porosity deriving method according to the third aspect, the filling material is an electrolyte.

The third aspect of the present invention makes it possible to derive a porosity of an electrolyte layer for use as a battery material.

A fourth aspect of the present invention is directed to a porosity deriving device including: a conveyer that conveys an inspection object; a basis weight meter that measures a basis weight of a specific part of the inspection object being conveyed; a thickness meter that measures a thickness of the specific part of the inspection object being conveyed; a storage that stores a true density of the inspection object; and a deriver that derives a porosity of the inspection object from the basis weight, the thickness, and the true density of the inspection object.

The fourth aspect of the present invention provides the porosity deriving device capable of deriving the porosity of the inspection object, while the inspection object is being conveyed.

A fifth aspect is an embodiment of the fourth aspect. In the porosity deriving device according to the fifth aspect, the inspection object is a base member filled with a filling material, the basis weight meter measures a basis weight of the base member and a basis weight of the filling material, the storage stores a true density of the filling material and a true density of the base member, and the deriver derives the porosity of the inspection object from the basis weight of the base member, the basis weight of the filling material, the thickness of the inspection object, the true density of the base member, and the true density of the filling material.

The fifth aspect of the present invention provides the porosity deriving device capable of deriving porosity of the base member filled with the filling material, while the base member is being conveyed.

DETAILED DESCRIPTION OF THE INVENTION

Figure 1A:
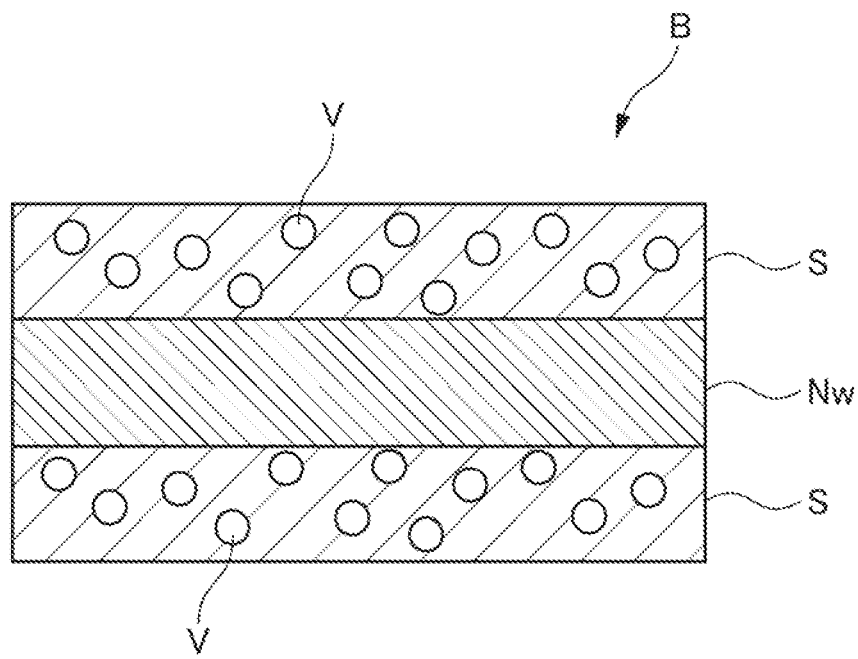
FIG. 1A is a conceptual cross-sectional view showing an inspection object which is an object of a porosity deriving method according to an embodiment.

An embodiment of the present invention will be described below with reference to the drawings. Contents of the present invention are not limited to the following examples.
<Porosity Deriving Method>

A porosity deriving method according to the present embodiment is for deriving a porosity of an inspection object, while the inspection object is being conveyed. The method of deriving the porosity includes a basis weight measuring step of measuring a basis weight of a specific part of the inspection object being conveyed, a thickness measuring step of measuring a thickness of the specific part of the inspection object being conveyed, and a porosity deriving step of deriving a porosity of a base member from the measured parameters and a true density of the inspection object.

(Basis Weight Measuring Step)

The basis weight measuring step is a step of measuring a basis weight ($g/m^2$) of the specific part of the inspection object being conveyed. An examples of a method of measuring the basis weight is not particularly limited as long as the inspection object being conveyed can be measured, but may include a method of detecting X-ray fluorescence. In the method of detecting the X-ray fluorescence, first, the inspection object to be measured is irradiated with X-rays to make atoms constituting the inspection object being in an excited state. Next, X-ray fluorescence generated when the atoms return to a stable state from the excited state is detected, whereby a basis weight of an inspection object, for example, a base member and a basis weight of a filling material can be measured. A detection result of the X-ray fluorescence is obtained as an energy intensity different for each element, and the basis weight of the inspection object can be calculated from the energy intensity. Further, according to the method using the X-ray fluorescence described above, since the basis weight of the inspection object to be measured can be measured in a non-contact manner, the basis weight of the inspection object being conveyed can be measured. An example of another method of measuring a basis weight may include a method of irradiating the inspection object to be measured with radioactive rays such as β-rays and measuring the amount of transmittance of the radioactive rays.

(Thickness Measuring Step)

The thickness measuring step is a step of measuring a thickness of the specific part of the inspection object being conveyed. An example of a method of measuring a thickness is not particularly limited as long as the inspection object being conveyed can be measured, but may include a method based on spectroscopic interference laser displacement measurement, for example. The method based on spectroscopic interference laser displacement measurement is, for example, a method of irradiating an inspection object with light containing various wavelengths in a state of arranging a pair of sensors on both sides in a thickness direction of the inspection object, measuring a distance from the sensors to the inspection object by measuring a difference in phase between reflected light and emitted light, and calculating a thickness of the inspection object. An example of another method of measuring a thickness includes a measurement method using ultrasonic waves, but is preferably method based on the spectroscopic interference laser displacement measurement from the viewpoint of measuring the inspection object with high accuracy.

Specific parts of the inspection object filled with the filling material, which are the measurement parts in the basis weight measuring step and the thickness measuring step, are the same specific part synchronized with each other. An example of a method of synchronizing the measurement parts in the basis weight measuring step and the thickness measuring step includes a method of recording position coordinates measured by the basis weight measurement device and instructing a thickness measurement device to measure the same position.

(Porosity Deriving Step)

The porosity deriving step is a step of deriving a porosity from the basis weight measured in the basis weight measuring step, the thickness measured in the thickness measuring step, and the true densities of the base member as the inspection object and the filling material. The porosity according to the present embodiment indicates a ratio (%) of a volume of pores in the base member to a volume of the filling material filled in the base member. The method of deriving the porosity will be described by taking, as an example, a solid electrolyte sheet, which is an example of the base member as the inspection object filled with the filling material.

FIG. 1A is a schematic cross-sectional view showing a configuration of a solid electrolyte sheet B in which a non-woven fabric sheet as a base member is filled with a solid electrolyte as a filling material. As shown in FIG. 1A, the solid electrolyte sheet B includes solid electrolyte layers S and a non-woven fabric layer Nw. The non-woven fabric layer Nw is filled with a solid electrolyte. Innumerable pores V exist in the solid electrolyte layer S. When N pores having a volume $v_1$ exist in the filling material having a volume V, the porosity can be obtained by Formula (1) below.

$$\text{Porosity [\%]} = (N \times v_1)/V \times 100 \tag{1}$$

Here, assuming that the pores existing in the base member are laminated with a thickness "h" on one side of the filling material having a thickness "H", the porosity in Formula (1) above is equal to a ratio of the thickness "h" to the thickness "H".

Figure 1B:
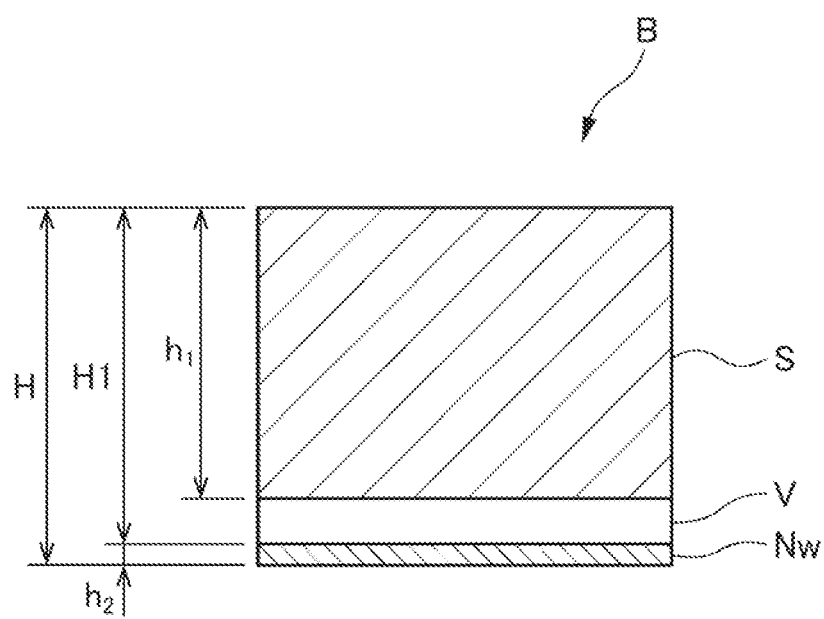
FIG. 1B is a conceptual cross-sectional view for use in the derivation method at the time of deriving a porosity from FIG. 1A.

FIG. 1B is a conceptual diagram showing a thickness of each layer when the pore V, the solid electrolyte layer S, and the non-woven fabric layer Nw in FIG. 1A are laminated independently in order from one end side of the solid electrolyte sheet B. As shown in FIG. 1B, a thickness H indicates a total thickness of the solid electrolyte sheet B. A thickness $h_1$ indicates a thickness of the solid electrolyte layer S, and a thickness $h_2$ indicates an actual thickness of the non-woven fabric layer Nw containing only the non-woven fabric as the base member. The porosity to be derived is a volume ratio of the pores existing in the solid electrolyte which is the filling material. Accordingly, the porosity is derived as the thickness of the pore V with respect to a thickness (indicated by H1 in FIG. 1B) obtained by subtracting the actual thickness $h_2$, of the non-woven fabric layer Nw as the base member from the total thickness H of the sheet B. Specifically, the porosity is derived by Formula (2) below. When the inspection object is an inspection object which is formed of, for example, only the solid electrolyte S without including the base member such as the non-woven fabric Nw, the thickness $h_2$ in Formula (2) below is set to 0.

$$\text{Porosity [\%]} = \{1 - h_1/(H - h_2)\} \times 100 \tag{2}$$

Here, the thickness H in Formula (2) above is a thickness, which is measured in the thickness measuring step, at a specific part of the base member filled with the filling material. The thickness $h_1$ can be calculated, as a thickness at a specific part, from the basis weight ($g/m^2$), which is measured in the basis weight measuring step, at the specific part of the solid electrolyte S and the pre-obtained true density ($g/m^3$) of the solid electrolyte S which is the filling material. Similarly, the thickness $h_2$ can be calculated as a thickness at a specific part by previously obtaining the true density of the non-woven fabric Nw as the base member.

According to the method of deriving the porosity according to the present embodiment, it is possible to the porosity of the base member, which is the inspection object being conveyed, with high accuracy in a non-contact manner.

<Inspection Object>

An example of the inspection object according to the present embodiment is not particularly limited, but may include an inspection object in which a base member capable of being filled with a filling material and made of a porous body is filled with a filling material. In the method of deriving the porosity according to the present embodiment, the inspection object may not include the base member. For example, the method of deriving the porosity according to the present embodiment can also be applied to an inspection object formed only by an electrolyte exemplified below as a filling material. The inspection object may be a member having an outer shape of the sheet shape as shown in FIG. 1A.

(Base Member)

In the method of deriving the porosity according to the present embodiment, the base member as the inspection object is not particularly limited as long as pores are provided in which the filling material can be filled. When the filling material filled in the base member is an electrolyte such as a solid electrolyte to be described below and the base member filled with the filling material is to be used as a solid electrolyte sheet, the base member is preferably in a shape of a non-woven fabric. This makes it easy to satisfy porosity and a thickness suitable for the solid electrolyte layer. The shape of the base member may be a shape of a woven fabric or a porous shape. Additionally, when the base member filled with the filling material is to be used as an electrode current collector for a lithium-ion secondary battery, the base member may be a metal porous body such as metal foam.

A material of the base member is not particularly limited, but examples of the material of the base member for use as the solid electrolyte layer include polyethylene terephthalate, nylon, aramid, $Al_2O_3$, and glass. Additionally, examples of the material of the base member for use as the electrode current collector include a metal porous body made of copper, aluminum, or SUS.

(Filling Material)

The filling material to be filled in the base member according to the present embodiment is not particularly limited. When the base member filled with the filling material is to be used as an electrolyte sheet for a lithium-ion secondary battery, examples of the electrolyte to be filled include a sulfide solid electrolyte material, an oxide solid electrolyte material, a nitride solid electrolyte material, and a halide solid electrolyte material. Additionally, the electrolyte to be filled may be a known liquid electrolyte for use in a liquid-based battery or a gelatinous electrolyte. When the base member filled with the filling material is to be used as an electrode current collector for a lithium-ion secondary battery, examples of the filling material to be filled include an electrode mixture such as a negative electrode mixture or a positive electrode mixture.

A method of filling the base member with the filling material is not particularly limited, and a filling method can be selected according to the type of the base member and the filling material. As an example, there is a method of coating slurry, which is prepared by dissolving or dispersing a solid electrolyte in a solvent, onto the base member of the shape of the non-woven fabric and drying the base member. Examples of the coating method include slide die coating, comma die coating, comma reverse coating, gravure coating, and gravure reverse coating. Examples of drying method include a method using hot air, a heater, and a drying device using a high frequency. Strength and density may be increased by pressurization with a sheet press or a roll press after drying.

The thickness and the porosity of the base member filled with the filling material are particularly limited. However, for example, when the base member filled with the filling material is to be used as an electrolyte sheet for a lithium-ion secondary battery, there is a porosity most suitable for the base member from the viewpoint of preventing a decrease in ionic conductivity.

<Porosity Deriving Device>

Figure 2:
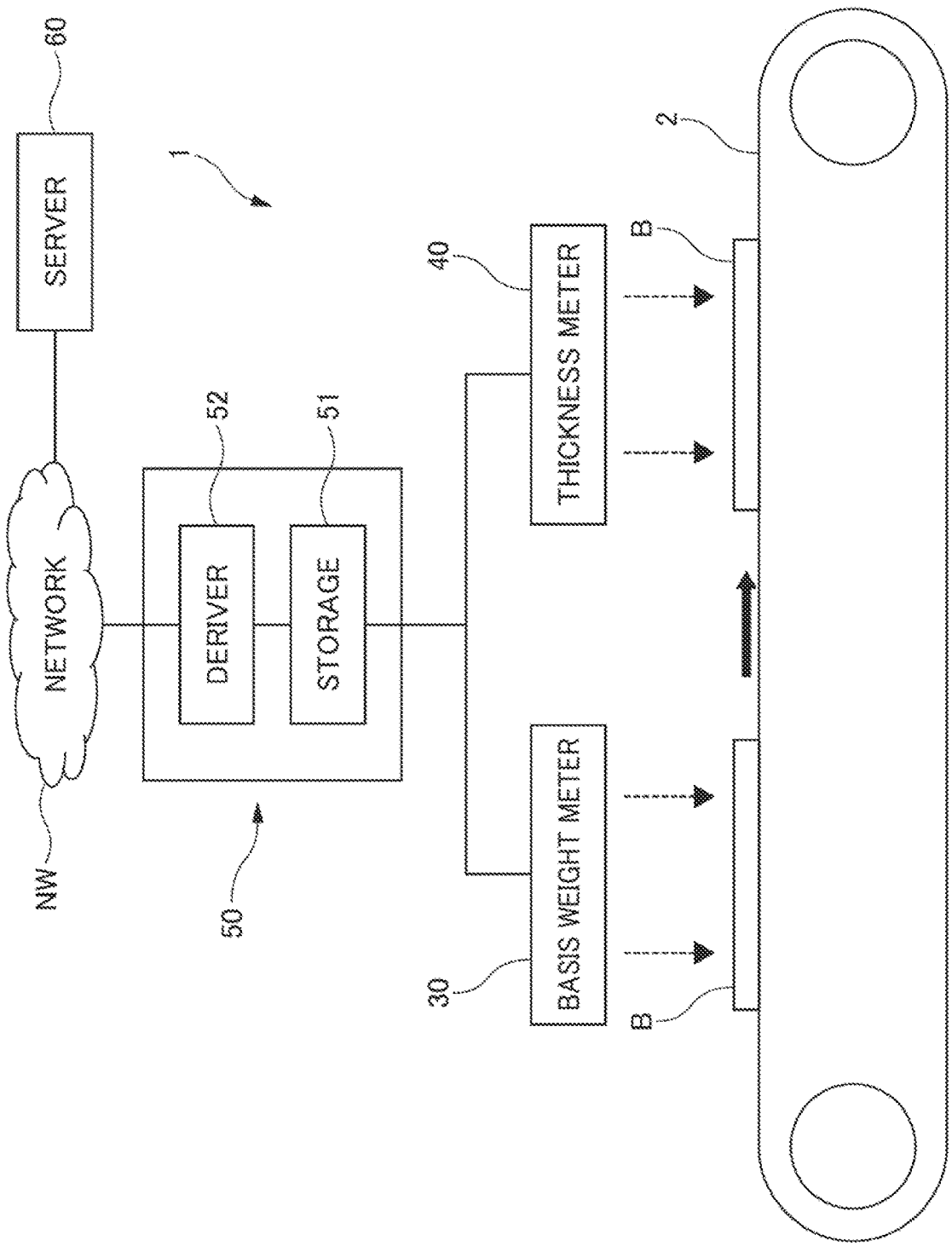
FIG. 2 is a schematic diagram showing a porosity deriving device according to the embodiment.

A porosity deriving device according to the present embodiment is a device capable of deriving a porosity of an inspection object being conveyed. The inspection object may be a base member filled with a filling material, or an inspection object having no base member. As shown in FIG. 2, the porosity deriving device 1 includes a conveyer 2, a basis weight meter 30, a thickness meter 40, and an operation unit 50 including a storage 51 and a deriver 52. The operation unit 50 is communicably connected to a server 60 via a network NW.

The conveyer 2 is not particularly limited, and can use a known conveyance device capable of conveying an inspection object at a predetermined speed, such as a belt conveyor capable of conveying an inspection object B.

(Basis Weight Meter)

The basis weight meter 30 is not particularly limited, and can use a known device, for example, an X-ray fluorescence detector or a β-ray thickness meter, which is capable of measuring the basis weight of the inspection object B in a non-contact manner. When the inspection object B is a base member filled with a filling material, the basis weight meter 30 preferably measures a basis weight of the base member and a basis weight of the filling material.

(Thickness Meter)

The thickness meter 40 is not particularly limited, and can use a known device capable of measuring a distance to an object in a non-contact manner, for example, a spectroscopic interference laser displacement meter using laser light which is converging light of visible light, ultraviolet light, and infrared light.

(Operation Unit)

The operation unit 50 includes the storage 51 and the deriver 52. Additionally, the operation unit 50 includes an input unit configured to receive an input of various information, for example, true densities of the base member as the inspection object and the filling material from a user of the porosity deriving device 1 and an output unit capable of outputting the porosity derived by the deriver 52. Additionally, the operation unit 50 may include a determination unit that determines whether the porosity derived by the deriver 52 is within a predetermined numerical range. The operation unit 50 is communicably connected to the basis weight meter 30 and the thickness meter 40 by a wired or wireless communication system, and communicably connected to the server 60 via the network NW. The operation unit 50 is not particularly limited, and is realized by known devices, for example, a storage memory or a hard disk, an arithmetic device such as a CPU, and a display device.

(Storage)

In the storage 51, the true densities of the base member as the inspection object and the filling material are input and stored in advance. Further, the storage 51 stores in advance the above-described calculation formulas for deriving the porosity and a program for executing the calculation formulas. Additionally, the storage 51 stores measurement position coordinates of the inspection object B measured by the basis weight meter 30 and the thickness meter 40 and the measured values of the basis weight and the thickness.

(Deriver)

The deriver 52 derives a porosity, according to the above-described calculation formulas for deriving the porosity, from the true density of the base member and the true density of the filling material, which are stored in the storage 51 and the measured values of the basis weight and the thickness of the inspection object B measured by the basis weight meter 30 and the thickness meter 40.

A description will be given with respect to an outline of a procedure for measuring the porosity of the inspection object B using the porosity deriving device 1 having the above configuration. First, the basis weight meter 30 measures the basis weight of the inspection object B, and transmits the basis weight and the measurement position coordinates of the inspection object B to the operation unit 50. The transmitted basis weight and measurement position coordinates of the inspection object B are stored in the storage 51. Next, the operation unit 50 transmits the measurement position coordinates of the inspection object B to the thickness meter 40. The thickness meter 40 measures a thickness of the inspection object B in the received measurement position coordinates of the inspection object B, and transmits the thickness to the operation unit 50. The transmitted thickness of the inspection object B is stored in the storage 51. Next, the deriver 52 derives a porosity of the inspection object B from the true densities of the base member and the filling material forming the inspection object B which are stored in advance in the storage 51 and the measured values of the basis weight and the thickness of the inspection object B. The operation unit 50 transmits the derived porosity and measurement position coordinates of the inspection object B to the server 60 via the network NW. In the server 60, it is determined whether the porosity of the inspection object B is within a predetermined numerical range, and defective products are found.

According to the porosity deriving device 1 having the above-described configuration, the porosity of the inspection object B to be conveyed on the production line can be measured in real time during the conveyance instead of a sampling method, so that defective products can be reliably found and a defective rate can be reduced at the same time.

Although the preferred embodiment of the present invention has been described above, the contents of the present invention are not limited to the above-described embodiment and can be changed as appropriate.

EXPLANATION OF REFERENCE NUMERALS 1 porosity deriving device
30 basis weight meter
40 thickness meter
51 storage
52 deriver
B inspection object
S solid electrolyte (electrolyte)
Nw non-woven fabric

What is claimed is:
1. A porosity deriving method of deriving a porosity of an inspection object that is a base member filled with a filling material, the porosity deriving method comprising:
a basis weight measuring step including measuring a basis weight of a specific part of the inspection object being conveyed on a conveyor;
a thickness measuring step including measuring a thickness of the specific part of the inspection object being conveyed on the conveyor; and
a porosity deriving step including deriving a porosity of the inspection object from the basis weight, the thickness, and a true density of the inspection object,
wherein the basis weight measuring step includes measuring a basis weight of the base member and a basis weight of the filling material separately from each other, and
wherein the porosity deriving step includes deriving the porosity of the inspection object from the basis weight of the base member, the basis weight of the filling material, the thickness of the specific part of the inspection object, a true density of the base member, and a true density of the filling material.

2. The porosity deriving method according to claim 1, wherein the filling material is an electrolyte.

3. The porosity deriving method according to claim 1, wherein the basis weight measuring step, the thickness measuring step, and the porosity deriving step are each carried out while the inspection object is being conveyed on the conveyor.

4. A porosity deriving device comprising:
a conveyer that conveys an inspection object that is a base member filled with a filling material;
a basis weight meter that measures a basis weight of a specific part of the inspection object being conveyed on the conveyor;
a thickness meter that measures a thickness of the specific part of the inspection object being conveyed on the conveyor;
a storage that stores a true density of the inspection object; and
a deriver that derives a porosity of the inspection object from the basis weight, the thickness, and the true density of the inspection object,
wherein the basis weight meter measures a basis weight of the base member and a basis weight of the filling material separately from each other, and
wherein the deriver derives the porosity of the inspection object from the basis weight of the base member, the basis weight of the filling material, the thickness of the specific part of the inspection object, a true density of the base member and a true density of the filling material.

5. The porosity deriving device according to claim 4, wherein the deriver derives the porosity of the inspection object while the inspection object is being conveyed on the conveyor.

6. A porosity deriving method of deriving a porosity of a manufactured inspection object that is a base member filled with a filling material, the base member having therein pores that are able to be filled with the filling material, the porosity deriving method comprising: a basis weight measuring step including measuring a basis weight of a specific part of the manufactured inspection object; a thickness measuring step including measuring a thickness of the specific part of the manufactured inspection object; and a porosity deriving step including deriving a porosity of the manufactured inspection object from the basis weight, the thickness, and a true density of the manufactured inspection object, wherein the basis weight measuring step includes measuring a basis weight of the base member and a basis weight of the filling material separately from each other, and wherein the porosity deriving step includes deriving the porosity of the manufactured inspection object from the basis weight of the base member, the basis weight of the filling material, the thickness of the specific part of the manufactured inspection object, a true density of the base member, and a true density of the filling material.

7. A porosity deriving device comprising:
- a conveyer that conveys an inspection object that is a base member filled with a filling material, the base member having therein pores that are able to be filled with the filling material;
- a basis weight meter that measures a basis weight of a specific part of the inspection object;
- a thickness meter that measures a thickness of the specific part of the inspection object;
- a storage that stores a true density of the inspection object; and
- a deriver that derives a porosity of the inspection object from the basis weight, the thickness, and the true density of the inspection object;
- wherein the basis weight meter measures a basis weight of the base member and a basis weight of the filling material separately from each other, and
- wherein the deriver derives the porosity of the inspection object from the basis weight of the base member, the basis weight of the filling material, the thickness of the specific part of the inspection object, a true density of the base member, and a true density of the filling material.

* * * * *